United States Patent [19]

Yasue et al.

[11] Patent Number: 4,800,781

[45] Date of Patent: Jan. 31, 1989

[54] SYSTEM FOR INTEGRALLY CONTROLLING AUTOMATIC TRANSMISSION AND ENGINE

[75] Inventors: Hideki Yasue; Kagenori Fukumura, both of Toyota, Japan

[73] Assignee: Toyota Jidosha Kabushiki Kaisha, Aichi, Japan

[21] Appl. No.: 37,253

[22] Filed: Apr. 10, 1987

[30] Foreign Application Priority Data

Apr. 14, 1986 [JP] Japan .................................. 61-85533

[51] Int. Cl.$^4$ ............................................. B60K 41/08
[52] U.S. Cl. ........................................ 74/860; 74/851; 74/872
[58] Field of Search ................. 74/851, 852, 853, 854, 74/855, 857, 860, 866, 872; 364/424.1

[56] References Cited

U.S. PATENT DOCUMENTS

| | | | |
|---|---|---|---|
| 2,917,141 | 12/1959 | Neracher et al. | 74/853 |
| 3,545,307 | 12/1970 | Bildat | 74/855 X |
| 3,626,455 | 12/1971 | Toda et al. | 74/860 |
| 4,266,447 | 5/1981 | Heess et al. | 74/852 X |
| 4,370,903 | 2/1983 | Stroh et al. | 74/851 X |
| 4,403,527 | 9/1983 | Mohl et al. | 74/851 |
| 4,507,985 | 4/1985 | Morimoto et al. | 74/866 |
| 4,616,530 | 10/1986 | Tanaka et al. | 74/860 X |
| 4,635,508 | 1/1987 | Tatsumi | 74/866 |
| 4,680,711 | 7/1987 | Miyawaki | 364/424.1 |
| 4,704,683 | 11/1987 | Osanai | 74/866 X |

FOREIGN PATENT DOCUMENTS

| | | | |
|---|---|---|---|
| 55-69738 | 5/1980 | Japan . | |
| 0001855 | 1/1984 | Japan | 364/424.1 |
| 231049 | 11/1985 | Japan | 74/866 |
| 1191324 | 11/1985 | U.S.S.R. | 364/424.1 |

Primary Examiner—Leslie A. Braun
Assistant Examiner—Harold F. Macris
Attorney, Agent, or Firm—Parkhurst, Oliff & Berridge

[57] ABSTRACT

In a system for integrally controlling an automatic transmission and an engine, an ignition timing is temporarily lagged during shifting to decrease an engine torque. The system comprises a detecting device for detecting the presence of a shifting condition; a delaying device for delaying the commencement of actual shifting for a predetermined time duration; and a performing device for performing a fuel increase immediately after the presence of the shifting condition is detected. As a result, a decrease in the engine torque due to ignition timing control is satisfactorily secured, while exhaust gas temperature is prevented from rising, whereby temperature in an exhaust system is precluded from raising beyond an allowable value.

7 Claims, 6 Drawing Sheets

FIG. 6 ated to selectively switch the engagements of the frictionally engaging devices, so that any one of a plurality of gear stages can be achieved in accordance with a preset shift map, are well known in the transmission art.

SYSTEM FOR INTEGRALLY CONTROLLING AUTOMATIC TRANSMISSION AND ENGINE

BACKGROUND OF THE INVENTION

This invention relates to a system for integrally controlling an automatic transmission and an engine, and more particularly to improvements in a system for integrally controlling an automatic transmission and an engine, wherein the engine ignition timing is temporarily lagged during shifting to decrease engine torque.

Automatic transmissions comprising gear transmission mechanisms, a plurality of frictionally engaging devices, and hydraulic pressure control devices operated to selectively switch the engagements of the frictionally engaging devices, so that any one of a plurality of gear stages can be achieved in accordance with a preset shift map, are well known in the transmission art.

Furthermore, in an automatic transmission for a vehicle of the type described, various systems have been implemented for integrally controlling an automatic transmission and an engine, wherein engine torque is changed during shifting to obtain satisfactory shift characteristics and durability of the frictionally engaging devices (For example, Japanese Patent Laid-Open No. 69738/1980). More specifically, in such system the amount of torque transmitted from the engine is changed during shifting and the amount of absorbed energy in various members in the automatic transmission or in the frictionally engaging devices for controlling these members is controlled so as to complete a shifting within a short period of time under a low shift shock. As a consequence, drive comfort is enhanced and durability of the frictionally engaging devices is improved.

However, when ignition timing is delayed as a method of changing (decreasing) engine torque during shifting, problems are encountered. One such problem is the increase in so-called after-burn. After-burn is caused by the opening of an exhaust valve before complete burning of the gaseous mixture in the engine cylinders due to the delay of ignition timing. As a result of after-burn, high temperature burning gas is exhausted into the exhaust pipe, causing the temperature of the exhaust system (exhaust gas temperature, catalyst temperature, exhaust pipe temperature and the like) to rise.

However, when running in mountainous areas, where the shift frequency is high, or where a user intentionally performs on-off operations of an accelerator, the temperature of the exhaust system rises to a tolerance value or more, and in an extreme case, durability of the exhaust manifold is reduced. Further, in a turbo-charged engine system the temperature of the exhaust system can have an adverse impact on the durability of the turbine blades on the exhaust side.

One countermeasure for attempting to obviate the above-described disadvantages is to design a routine relating to the engine torque control which sets the map of the engine torque change value, assuming shiftings are performed at the expected highest frequency. However, with this method, the reduction value of the engine torque during shifting is naturally decreased, with the result that improvement of shift characteristics, including the durability of the frictionally engaging devices, cannot be satisfactorily achieved.

Another countermeasure to obviate such disadvantages is to increase the fuel injection flow rate while performing lag angle control (ignition timing delay control), to thereby lower exhaust gas temperature. However, according to this method, if the fuel increase is performed simultaneous with or after the lag angle control is carried out, little or no lowering of the exhaust gas temperature is advantageously obtained.

SUMMARY OF THE INVENTION

The present invention has been developed to obviate the aforesaid disadvantage of the second countermeasure and has as its object the provision of a system for integrally controlling an automatic transmission and an engine, wherein while an effect of lowering the engine torque by lag angle control is satisfactorily secured, exhaust gas temperature is prevented from rising, so that temperature in an exhaust system is not raised beyond an allowable value.

Figure 1:
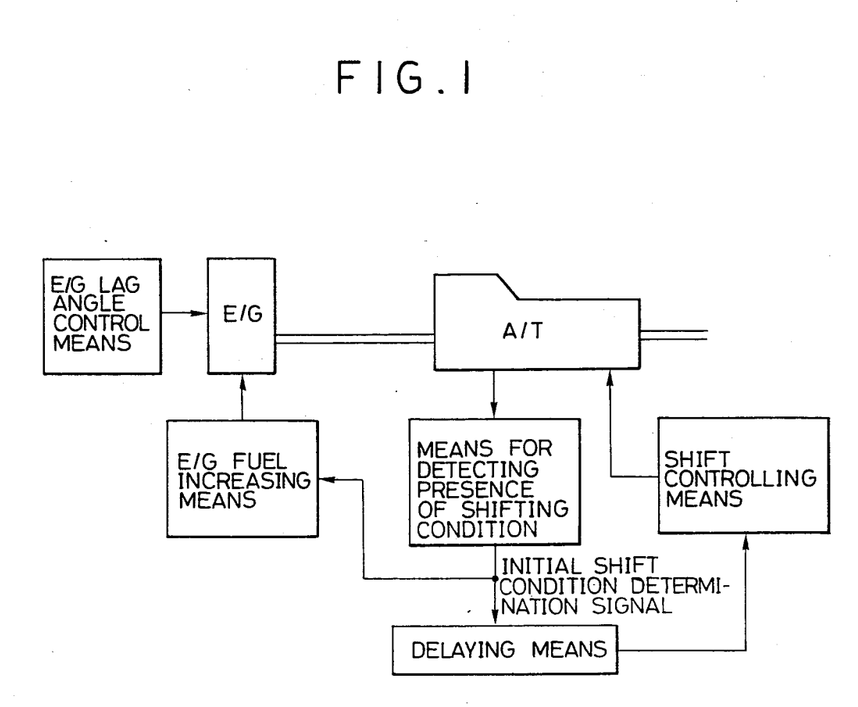
FIG. 1 is a block diagram showing the technical illustration of the present invention.

The present invention, as generally shown in FIG. 1, is directed to a system for integrally controlling an automatic transmission and an engine, wherein the engine ignition timing is temporarily lagged during shifting to decrease engine torque. The system includes apparatus for detecting the presence of a shifting condition; apparatus for delaying the actual commencement of shifting for a predetermined time duration; and apparatus for performing the fuel increase immediately after the detection of the presence of the shifting condition. Namely, simultaneously with detection of the presence of a shifting condition, the fuel increase is carried out. At such time as the effect of the fuel increase is actually secured, i.e., upon lapse of a predetermined time duration, actual shifting is carried out. As a result, the rise in exhaust gas temperature due to performing of lag angle control is effectively prevented by the fuel increase. Moreover, the proper effect of the lag angle control, i.e., securing of the durability of the frictionally engaging devices and reduction of shift shocks in the automatic transmission can be reliably attained.

Incidentally, the engines are adapted to obtain the maximal output when a flow rate of fuel, which can form the optimal air-fuel ratio, is injected and the injected fuel is ignited at the optimal timing. As a consequence, the original object of lag angle control to decrease engine torque can be achieved, without creating additional problems, such as rising exhaust gas temperatures.

In preferable embodiment of the present invention, the predetermined time duration is changed in accordance with at least one of a type of shifting, an engine load, a vehicle speed, working oil temperature of the automatic transmission, engine temperature and engine cooling water temperature.

Preferably, the amount of the fuel increase is changed in accordance with at least one of a type of shifting, an engine load, a vehicle speed, engine temperature, engine cooling water temperature and an engine rotary speed.

Preferably, the fuel increase is carried out only for a second predetermined time duration.

Preferably, the second predetermined time duration is changed in accordance with at least one of a type of shifting, an engine load, a vehicle speed, working oil temperature of the automatic transmission, engine temperature, engine cooling water temperature and an engine rotary speed.

Preferably, the fuel increase is ended in association with either completion of the shifting or completion of the lag angle control.

With the above-described arrangements, the present invention can be worked more precisely in conformity with the various conditions. Incidentally, for higher engine loads, lower vehicle speeds, higher working oil temperatures of the automatic transmission, higher engine temperatures, higher engine cooling water temperatures and higher engine rotary speeds, the predetermined time duration should be increased, the amount of the fuel increase should be increased and the second predetermined time duration should be increased. As for types of shifting, since the trends are varied with the respective types of the engines and the automatic transmissions, the predetermined time duration, the amount of the fuel increase and the second predetermined time duration should be changed case by case respectively.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate the same or similar parts and wherein.

DESCRIPTION OF THE PREFERRED EMBODIMENTS

The present invention will be described in detail with reference to the accompanying drawings which illustrate preferred embodiment of the present invention.

Figure 2:
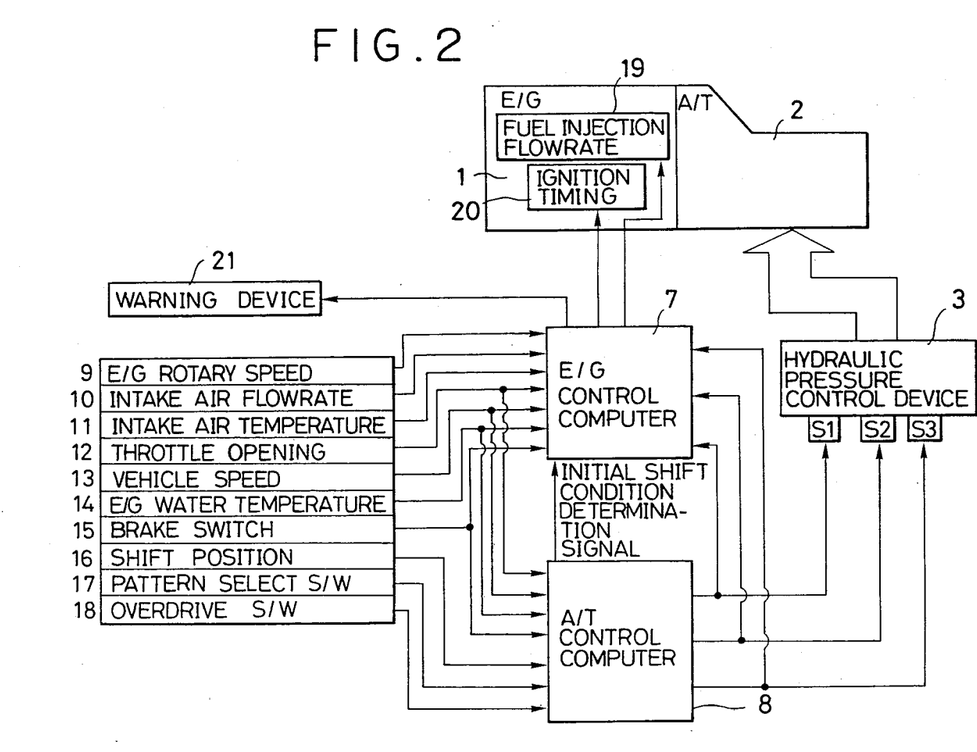
FIG. 2 is a block diagram generally showing an arrangement of an embodiment of a system for integrally controlling an automatic transmission and an engine according to the present invention.

FIG. 2 is a block diagram showing the general arrangement of the system for integrally controlling an automatic transmission and an engine, to which the present invention is applied.

Engine 1 and automatic transmission 2 are of types well-known. In the engine 1, fuel injection flowrate at an injector 19 and an ignition timing at a distributor 20 are controlled by an engine control computer 7, so that engine output in proportion to accelerator opening and engine rotary speed can be obtained. In the automatic transmission 2, electromagnetic valves S1-S3 are controlled by an automatic transmission control computer 8 and oil lines in a hydraulic pressure control device 3 are changed whereby the engagements of frictionally engaging devices are selectively changed, so that a gear stage proportional to vehicle speed and accelerator opening can be obtained.

More specifically, the engine control computer 7 receives signals of engine rotary speed from an engine rotary speed sensor (crank angle sensor) 9; intake air flowrate from an air flow meter 10; intake air temperature from an intake air temperature sensor 11; throttle opening from a throttle sensor 12; vehicle speed from a vehicle speed sensor 13; engine water temperature from a water temperature sensor 14; and brake-ON signal from a brake switch 15. The engine control computer 7 determines the fuel injection flowrate and the ignition timing in response to the above-mentioned signals. Furthermore, the engine control computer 7 receives solenoid signals of the electromagnetic valves S1-S3 ON-OFF controlled by the automatic transmission control computer 8, whereby the engine control computer 7 determines shift timing of the automatic transmission, and carries out the engine torque control by ignition timing control (lag angle control).

On the other hand, the automatic transmission control computer 8 receives signals from the throttle sensor 12, the vehicle speed sensor 13, the water temperature sensor 14, the brake switch 15, etc., and further, signals of position of a shift lever from a shift position sensor 16, running selection pattern such as a fuel consumption running mode and a power performance running mode from a pattern select switch 17, permission of an overdrive shifting from an overdrive switch 18, and the like, whereby the electromagnetic valves S1-S3 are ON-OFF controlled, so that a gear stage proportional to the vehicle spped and the accelerator opening can be obtained.

Figure 3:
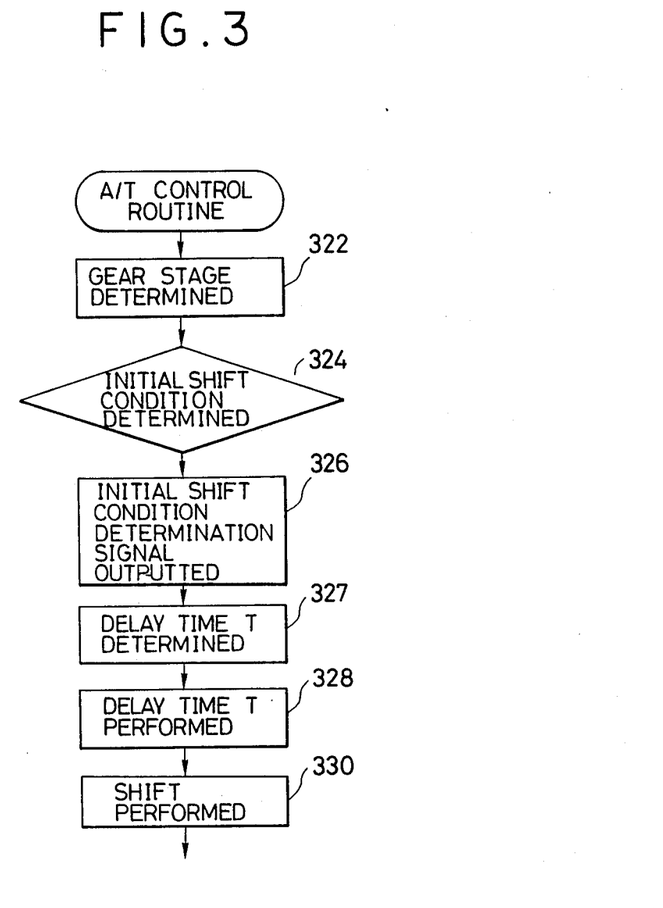
FIG. 3 is a flow chart showing an automatic transmission control routine adopted in the above embodiment.

FIG. 3 is a flow chart showing the engine control routine.

In Step 322, the gear stage of the transmission is determined in accordance with a shift map predetermined in response to signals of a vehicle speed, a throttle opening and the like. An initial shift condition determination is performed when the vehicle speed or the throttle opening traverses a shift line of the shift map and a shifting is needed (Step 324). Simultaneously, a signal of this initial shift condition determination signal is outputted to the engine control computer (Step 326). After the initial shift condition determination is performed, in Step 327, in response to the type of shiftng, throttle opening and working oil temperature of the automatic transmission, a delay time for delaying the actual shifting (predetermined time duration) T are determined (Step 327). In Step 328, after a lapse of the delay time T, a shift signal is outputted to the electromagnetic solenoid valves S1-S3, and a shifting is actually carried out (Step 330). This delay time T is determined for each type of shifting. Further, the larger the throttle opening is and the higher the working oil temperature of the automatic transmission is, the longer the delay time T should be corrected to be.

Figure 4:
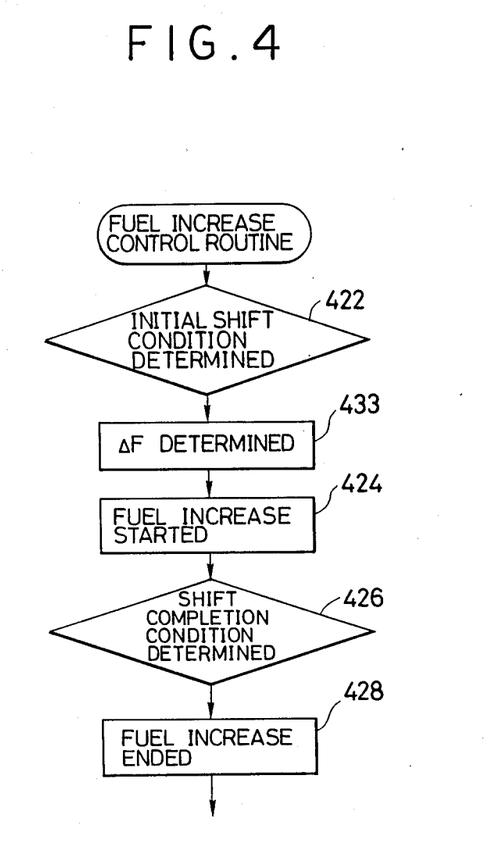
FIG. 4 is a flow chart showing a fuel increase control routine adopted in the above embodiment.

FIG. 4 is the fuel increase control routine to go with the lag angle control.

In a main routine of the engine control, when the initial shift condition determination signal is inputted from the automatic transmission side (Step 422), an amount $\Delta F$ of the fuel increase is determined in accordance with a map predetermined by the type of shifting, the throttle opening and the engine rotary speed in Step 423. The maps are prepared for every type of shifting and, as the throttle opening and engine rotary speed increase, the amount of fuel increase in the map should also increase. After the $\Delta F$ determination, the fuel increase begins in Step 424. As the shifting progresses, and when the engine rotary speed Ne is changed to a rotary speed NeA obtained by adding a predetermined value N1 (including a negative number) to an engine rotary speed NeB at the time of completion of the shifting (the NeB being obtained from the output shaft rotary speed and the gear ratio after shifting) the completion of the shifting is determined (Step 426). Thereafter, the fuel increase is ended slowly taking a predetermined time duration, and the fuel injection quantity is restored to the normal states (Step 428).

Figure 5:
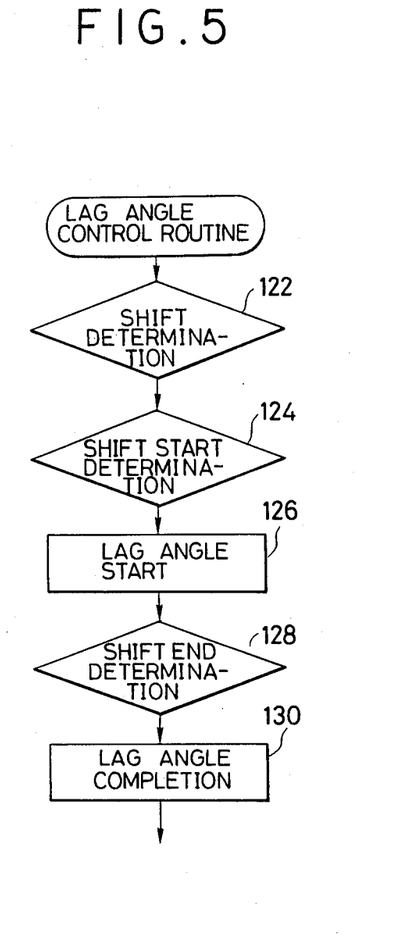
FIG. 5 is a flow chart showing a lag angle control routine adopted in the above embodiment.

FIG. 5 is a flow chart showing the outline of integral control of the engine and the automatic transmission.

In a control routine of the engine control computer 7, generation of a shifting (shift command) is determined from a change in signal of the electromagnetic valves S1–S3 (Step 122). Thereafter in Step 124, the actual start of the shifting is determined at a time when the engine rotary speed is changed (for example, when it is an upshift, the engine rotary speed is lowered). A lag angle control is started in accordance with a lag angle value predetermimed by the type of shifting, a throttle opening and the like (Step 126). As the shifting advances, and when the engine rotary speed Ne is changed to the engine rotary speed NeA' obtained by adding a predetermined value N2 (N2<N1) to the engine rotary speed NeB at the time of completion of a shifting (the engine rotary speed NeB being obtained from a rotary speed of an output shaft rotary speed and the gear ratio after shifting) the completion of the shifting is determined (Step 128). Thereafter, the lag angle control is ended slowly taking a predetermined time, and ignition timing is restored to the normal state (Step 13).

Figure 6:
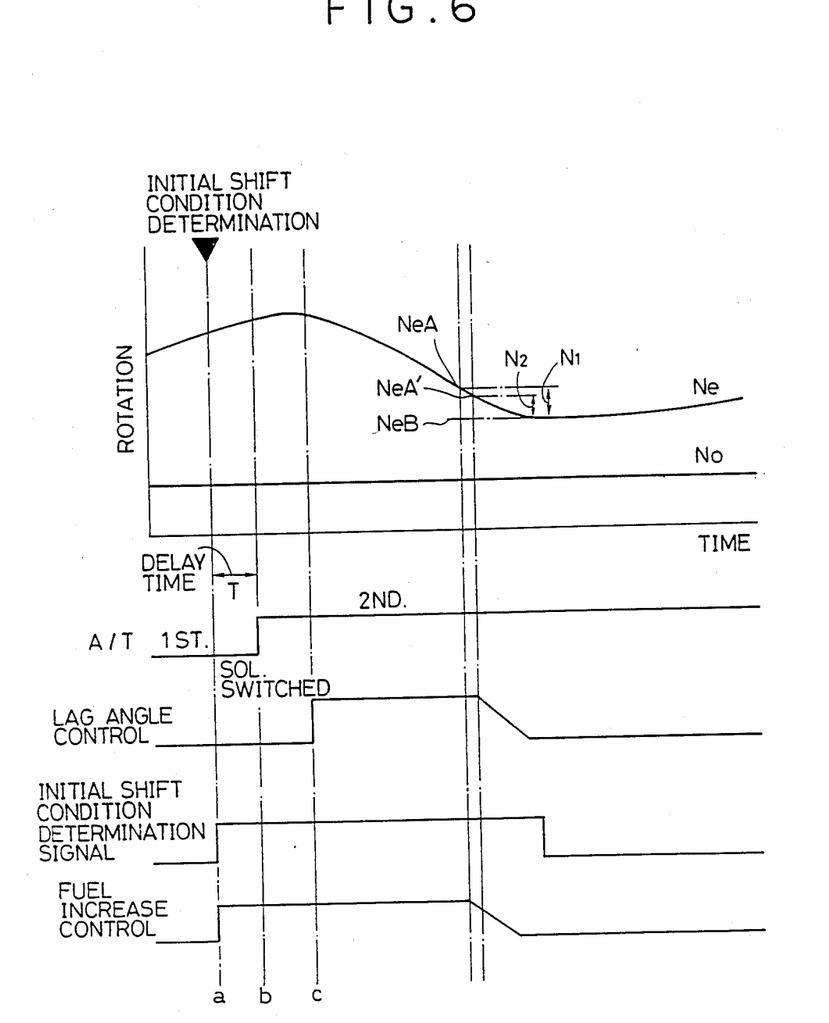
FIG. 6 is a shift transitional characteristics chart.

FIG. 6 combinedly shows the above-described flow in a time chart.

In the drawing, "a" indicates a time when an initial shift condition determination is performed on the basis of the shift map. Simultaneously with the initial determination of a shifting condition, the signal of the initial shift condition determination is produced. Upon receiving this initial shift condition determination signal, the fuel increase control is immediately started. Thereafter, at a time "b" when the delay time T elapses, switching of the electromagnetic valves S1–S3 (shift command) is carried out, and the lag angle control is performed from a time "c" when it is determined that the shifting is actually started. On the other hand, as the shifting progresses and when the engine rotary speed Ne is changed to the rotary speed NeA obtained by adding the predetermined value N1, to the engine rotary speed NeB at the time of completion of the shifting, the NeB being obtained from the output shaft rotary speed and the gear ratio, the fuel increase being performed is ended. Thereafter, the fuel injection quantity is restored to its normal state slowly. Furthermore, the lag angle control is ended at a time when the engine rotary speed Ne is changed to a rotary speed NeA' obtained by adding a predetermined value N2 to said engine rotary speed NeB, and ignition timing is restored to its normal state slowly. Additionally, the initial shift condition determination signal is reset to zero at a suitable time when it is considered that the series of works as described above are completed.

According to this embodiment, the fuel increase is started earlier than the start of lag angle control, so that lowering of the exhaust gas temperature due to the fuel increase can be more effectively realized. Furthermore, in carrying out this control, the delay time (predetermined time duration) T, the fuel increase value ΔF and the like are set in association with the type of shifting, the throttle opening, the engine rotary speed, the working oil temperature of the automatic transmission and the like, whereby finger control to meet the running conditions can be carried out, so that the integral control of an automatic transmission and an engine can be more effectively utilized. Further, since the lag angle value (which has heretofore been regulated due to the rise in the exhaust gas temperature) can be increased to the optimum value, with the result that the engine torque down value can be increased accordingly, the durability of the frictionally engaging devices is enhanced and shift shocks of the automatic transmission are reduced.

Incidentally, in this embodiment, the fuel increase is terminated in association with completion of the shifting, however, the fuel increase may be terminated upon lapse of a second predetermined time duration after the start of the fuel increase. In this case, this second predetermined time duration may be determined in association with the type of shifting, the engine load, the vehicle speed, the working oil temperature of the automatic transmission, the engine temperature, the engine cooling water temperature and the like. Furthermore, the fuel increase may be ended in association with completion of the lag angle control.

What is claimed is:

1. A system for integrally controlling an automatic transmission and an engine, said system comprising:
   gear shift means having a plurality of frictionally engaging devices for changing gear stages;
   hydraulic control means for selectively switching engagements of said plurality of frictionally engaging devices to obtain any one of a plurality of gear stages in accordance with a preset shift map;
   torque changing means for changing the torque of said engine by lagging ignition timing of the engine during said switching of the engagements of the frictionally engaging devices;
   means for detecting the presence of switching of the engagements of the frictionally engaging devices in accordance with said preset shift map;
   means for delaying actual commencement of said switching of the engagements of the frictionally engaging devices for a predetermined time duration; and
   means for performing a fuel increase of said engine immediately after detection of the presence of the switching of the engagements of the frictionally engaging devices.

2. The system as set forth in claim 1, further comprising:
   means for detecting at least one parameter of a type of shifting, an engine load, a vehicle speed, a working oil temperature of said automatic transmission, an engine temperature, an engine cooling water temperature and an engine rotary speed; and
   means for changing said predetermined time duration in accordance with said at least one parameter.

3. The system as set forth in claim 1, further comprising:
   means for detecting at least one parameter of a type of shifting, an engine load, a vehicle speed, a working oil temperature of the automatic transmission, an engine temperature, an engine cooling water temperature and an engine rotary speed; and
   means for changing a quantity of said fuel increase in accordance with said at least one parameter.

4. The system as set forth in claim 1, wherein said fuel increase is carried out only for a second predetermined time duration.

5. The system as set forth in claim 4, further comprising:
   means for detecting at least one parameter of a type of shifting, an engine load, a vehicle speed, a working oil temperature of the automatic transmission, an engine temperature, an engine cooling water temperature and an engine rotary speed; and means for changing said second predetermined time duration in accordance with said at least one parameter.

6. The system as set forth in claim 1, further comprising:
means for detecting completion of the shifting, wherein said fuel increase is terminated in association with completion of said shifting.

7. The system as set forth in claim 1, further comprising means for detecting completion of the lagging of the ignition timing, wherein said fuel increase is terminated in association with completion of the lagging of the ignition timing.

* * * * *